(12) United States Patent
Thunes et al.

(10) Patent No.: US 7,095,209 B2
(45) Date of Patent: Aug. 22, 2006

(54) METHOD AND APPARATUS TO REGULATE TORQUE PROVIDED TO LOADS

(75) Inventors: Jerry Dee Thunes, Greenfield, WI (US); Thomas J. Rehm, Mequon, WI (US); Takayoshi Matsuo, Brown Deer, WI (US); Masahiro Tsuyoshi, Menomonee Falls, WI (US); John Joseph Golownia, Jr., Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/047,453

(22) Filed: Jan. 31, 2005

(65) Prior Publication Data

US 2006/0066275 A1    Mar. 30, 2006

Related U.S. Application Data

(60) Provisional application No. 60/614,365, filed on Sep. 29, 2004.

(51) Int. Cl.
  *H02P 21/14* (2006.01)
(52) U.S. Cl. .............. 318/825; 318/727; 318/802; 318/807; 318/772; 318/825
(58) Field of Classification Search ............... None
  See application file for complete search history.

(56) References Cited

U.S. PATENT DOCUMENTS

| | | | |
|---|---|---|---|
| 4,724,373 A | | 2/1988 | Lipo |
| 4,968,925 A | * | 11/1990 | De Doncker ............... 318/727 |
| 5,162,727 A | * | 11/1992 | Hindsberg et al. ......... 324/772 |
| 5,166,593 A | * | 11/1992 | De Doncker et al. ....... 318/800 |
| 5,479,081 A | * | 12/1995 | Seibel et al. ............... 318/805 |
| 5,481,168 A | * | 1/1996 | Mutoh et al. ............... 318/432 |
| 5,532,570 A | * | 7/1996 | Tajima et al. .............. 318/809 |
| 5,729,113 A | * | 3/1998 | Jansen et al. .............. 318/799 |
| 5,796,236 A | * | 8/1998 | Royak ........................ 318/804 |
| 5,798,628 A | * | 8/1998 | Fujita et al. ................ 318/805 |
| 5,811,957 A | | 9/1998 | Bose et al. |
| 5,818,192 A | | 10/1998 | Nozari |
| 5,923,144 A | * | 7/1999 | Seibel et al. ............... 318/805 |
| 5,936,377 A | * | 8/1999 | Blaschke et al. ........... 318/807 |
| 5,965,995 A | * | 10/1999 | Seibel et al. ............... 318/805 |
| 5,973,474 A | | 10/1999 | Yamamoto |

(Continued)

FOREIGN PATENT DOCUMENTS

WO    WO 01/28211    4/2001

OTHER PUBLICATIONS

Idris, N. R. N. and Yatim, A. H. M. An Improved Stator Flux Estimation in Steady-State Operation for Direct Torque Control of Induction Machines, Jan./Feb. 2002, vol. 38, No. 1, IEEE Transactions on Industry Applications, pp. 110-116.*

(Continued)

*Primary Examiner*—Rina Duda
*Assistant Examiner*—Robert W. Horn
(74) *Attorney, Agent, or Firm*—Quarles & Brady, LLP; William R. WAlbrun

(57) ABSTRACT

A method and apparatus for use with a controller for controlling a machine wherein a torque reference value is provided, the method for identifying an error representative of the difference between the torque reference value and the torque applied to the machine and using the error value to modify machine operation.

20 Claims, 4 Drawing Sheets

U.S. PATENT DOCUMENTS

| | | | |
|---|---|---|---|
| 6,014,006 A * | 1/2000 | Stuntz et al. | 318/804 |
| 6,014,007 A * | 1/2000 | Seibel et al. | 318/805 |
| 6,069,467 A * | 5/2000 | Jansen | 318/802 |
| 6,137,258 A | 10/2000 | Jansen | |
| 6,335,605 B1 | 1/2002 | Negoro | |
| 6,362,590 B1 * | 3/2002 | Nozari | 318/609 |
| 6,377,018 B1 * | 4/2002 | Tajima et al. | 318/727 |
| 6,429,620 B1 | 8/2002 | Nakazawa | |
| 6,433,506 B1 * | 8/2002 | Pavlov et al. | 318/804 |
| 6,600,290 B1 * | 7/2003 | Niemela | 318/727 |
| 6,683,428 B1 | 1/2004 | Pavlov et al. | |
| 6,703,809 B1 * | 3/2004 | Royak et al. | 318/727 |
| 6,870,348 B1 * | 3/2005 | Mijalkovic et al. | 318/818 |
| 2001/0043048 A1 * | 11/2001 | Tajima et al. | 318/727 |
| 2004/0135533 A1 * | 7/2004 | Harakawa et al. | 318/609 |
| 2004/0249596 A1 * | 12/2004 | Ho | 702/106 |
| 2004/0257028 A1 * | 12/2004 | Schulz et al. | 318/802 |
| 2005/0057208 A1 * | 3/2005 | Seibel et al. | 318/432 |
| 2005/0146306 A1 * | 7/2005 | Ha et al. | 318/807 |
| 2005/0263330 A1 * | 12/2005 | Gallagher et al. | 180/65.1 |

OTHER PUBLICATIONS

Shin, M. et al., An Improved Stator Flux Estimation for Speed Sensorless Stator Flux Orientation Control of Induction Motors, Mar. 2000, vol. 15, No. 2, IEEE Transactions on Power Electronics, pp. 312-318.*

* cited by examiner

METHOD AND APPARATUS TO REGULATE TORQUE PROVIDED TO LOADS

CROSS-REFERENCE TO RELATED APPLICATIONS

This application claims priority to U.S. provisional application 60/614,365, filed Sep. 29, 2004, and is incorporated by reference herein.

STATEMENT REGARDING FEDERALLY SPONSORED RESEARCH OR DEVELOPMENT

Not applicable.

BACKGROUND OF THE INVENTION

The present invention relates to controllers providing adjustable frequency currents to loads and more specifically, to a method and apparatus to regulate torque provided to loads.

Induction Motors

Induction motors have broad application in industry, particularly when large horsepower is needed. A three phase induction motor receives three phases of electrical voltage to produce a rotating magnetic stator field. A rotor contained within the stator field experiences an induced current (hence the term induction) which generates a rotor field. The interaction of the rotor field and the stator field causes rotation of the rotor.

A common rotor design is a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field.

The use of this induced current to generate the rotor field eliminates the need for slip rings or brushes to provide power to the rotor, making the design relatively maintenance free.

Field Oriented Control of Induction Machines

To a first approximation, the torque and speed of an induction motor may be controlled by changing the frequency and magnitude of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is the difference in speed between the rotor and the stator field. An increase in slip increases the rate at which flux lines are cut by the rotor, increasing the rotor generated field and thus the force or torque between the rotor and stator fields.

Referring to FIG. 1, the rotating phasor 1 of the stator magneto motive force ("mmf") will generally have some angle α with respect to the phasor of rotor flux 2. The torque generated by the motor will be proportional to the magnitudes of these phasors 1 and 2 but also will be a function of their angle α. The maximum torque is produced when phasors 1 and 2 form a right angle to each other (e.g., α=90°) whereas zero torque is produced if these phasors are aligned (e.g., α=0°). Phasor 1 may therefore be usefully decomposed into a torque producing component 3 perpendicular to phasor 2 and a flux component 4 parallel to rotor flux phasor 2.

These two components 3 and 4 of the stator mmf are proportional, respectively, to two stator currents $i_{qs}$, a torque producing current and $i_{ds}$, a flux producing current, which may be represented by orthogonal vectors in the rotating frame of reference (synchronous frame of reference) of the stator flux having slowly varying magnitudes. Accordingly, in controlling an induction motor, it is generally desired to control not only the frequency of the applied voltage (hence the speed of the rotation of the stator flux phasor 1) but also the phase of the applied voltage relative to the current flow and hence the division of the currents through the stator windings into the $i_{qs}$ and $i_{ds}$ components. Control strategies that attempt to independently control the currents $i_{qs}$ and $i_{ds}$ are generally termed field oriented control strategies ("FOC").

While torque regulation has been contemplated in the past, unfortunately the regulation schemes adopted have not been very accurate. To this end, generally, at speeds below the rated motor speed, it has been assumed that the developed motor torque has been equal to a reference torque value. At speeds above rated speed, torque has been regulated in a pseudo open loop manner by dividing the torque reference value by an estimate of motor flux reduction value. More specifically, the torque reference is divided by a term proportional to the motor operating speed that is an estimate of the reduction in motor flux. Unfortunately, the term proportional to operating speed is a relatively inaccurate estimate of motor flux reduction and therefore torque regulation via one of these schemes is not very accurate. In addition, while system torque can change rapidly, operating frequency changes relatively slowly and therefore, in some cases, stability problems have been known to occur when operating frequency is used as an estimator of flux reduction. While such inaccurate torque regulators may work in some applications, such limited regulating capabilities are not acceptable for other applications.

Therefore, it would be advantageous to have a system that estimates torque quickly and accurately.

BRIEF SUMMARY OF THE INVENTION

It has been recognized that easily obtainable control system signals can be obtained and used to generate an essentially real time torque estimate value that can in turn be used to drive a torque trim regulator thereby generating a torque command value that can in turn be used to trim a reference voltage value thus driving the torque applied to an induction machine toward a reference and desired torque value.

In one aspect, the present invention provides a method for use with a controller for controlling a machine wherein a torque reference value is provided. The method comprises the steps of obtaining feedback current and voltage values corresponding to the currents and voltages provided to the machine, calculating an estimated torque and an estimated flux based on the feedback current values, and mathematically combining the estimated torque and the torque reference to generate a gain correction. The gain correction is then mathematically combined with the estimated flux value and the torque reference to generate a current command for the machine.

In another aspect of the invention, the machine is characterized by a pole count P and a stator resistance value $r_s$ and the step of calculating an estimated torque comprises evaluating the following equation:

$$T_{est} = \frac{3}{2} \cdot \left(\frac{P}{2}\right) \cdot \left(\left(\frac{V_{qsfb} - r_s \cdot i_{qsfb}}{\omega_e}\right) \cdot i_{qsfb} + \left(\frac{V_{dsfb} - r_s \cdot i_{dsfb}}{\omega_e}\right) \cdot i_{dsfb}\right)$$

wherein $V_{qsfb}$ is the q-axis feedback voltage value, $V_{dsfb}$ is d-axis feedback voltage value, $i_{qsfb}$ is the q-axis feedback current value, $i_{dsfb}$ is the d-axis feedback current value and $\omega_e$ is the operating frequency.

In yet another aspect of the invention, the machine is operated at an operating frequency $\omega_e$ and wherein, the step of calculating an estimated flux comprises evaluating the following equation:

$$\lambda_{dsest} = \frac{V_{qsfb} - r_s i_{qs}}{\omega_e}$$

wherein $V_{qsfb}$ is the q-axis feedback voltage value, $\omega_e$ is the operating frequency, $r_s$ is the stator resistance value of the machine, and $i_{qs}$ is the q-axis current value.

In another aspect of the invention, the step of mathematically combining the estimated torque and the torque reference to generate a gain correction comprises the steps of calculating the difference between the estimated torque and the torque reference to provide a torque error. The torque error is applied to a proportional integral control.

In still another aspect of the invention, the step of mathematically combining the gain correction, the estimated flux value, and the torque reference to generate a current command for the machine comprises summing the estimated flux with the gain correction and dividing the torque reference by the result of the summing operation.

In still yet another aspect of the invention, the controller is a field oriented controller.

In yet a further aspect of the invention, the machine is one of an induction machine, a synchronous machine or a permanent magnet motor.

In a still further aspect of the invention, the step of obtaining feedback currents and voltages includes obtaining d and q-axis feedback currents and voltages and the step of generating a current command value comprises generating a q-axis command current value to drive the machine.

In another aspect, the invention provides an apparatus for use with a controller providing command voltage signals to control a machine. A torque reference value is provided, and the apparatus identifies an error indicative of the difference between the reference torque value and the torque applied to the machine and uses the error value to modify control of the machine. The apparatus comprises sensors for obtaining current values corresponding to the currents provided to the machine, and a processor running software to mathematically combine the current values and feedback voltage values to generate a torque estimate and a flux estimate, mathematically combine the torque reference value and the torque estimate to generate a torque error value, mathematically combine the torque error value and the flux estimate to generate a corrected flux estimate, mathematically combine the corrected flux estimate and the torque reference to produce a current command, and use the current command value to control the machine.

In another aspect of the invention, the machine is characterized by a pole count P and a stator resistance value $r_s$ and, the controller is programmed to calculate an estimated torque by evaluating the following equation:

$$T_{est} = \frac{3}{2} \cdot \left(\frac{P}{2}\right) \cdot \left(\left(\frac{V_{qsfb} - r_s \cdot i_{qsfb}}{\omega_e}\right) \cdot i_{qsfb} + \left(\frac{V_{dsfb} - r_s \cdot i_{dsfb}}{\omega_e}\right) \cdot i_{dsfb}\right)$$

wherein $V_{qsfb}$ is the q-axis feedback voltage value, $V_{dsfb}$ is d-axis feedback voltage value, $i_{qsfb}$ is the q-axis feedback current value, $i_{dsfb}$ is the d-axis feedback current value and $\omega_e$ is the operating frequency.

In still another aspect, the machine is operated at an operating frequency $\omega_e$ and wherein, the controller is programmed to calculate an estimated flux by evaluating the following equation:

$$\lambda_{dsest} = \frac{V_{qsfb} - r_s i_{qs}}{\omega_e}$$

wherein $V_{qsfb}$ is the q-axis feedback voltage value, $\omega_e$ is the operating frequency, $r_s$ is the stator resistance value of the machine, and iqs is the q-axis current value.

In still another aspect of the invention, the controller is programmed to mathematically combine the estimated torque and the torque reference to generate an error value by calculating a difference between the estimated torque and the torque reference to provide a torque error.

In yet still another aspect of the invention, the controller is programmed to mathematically combine the gain correction, the estimated flux value, and the torque reference to generate a current command for the machine by summing the estimated flux with the gain correction and dividing the torque reference by the result of the summing operation.

In yet a further aspect of the invention, further comprising the step of providing the torque error to a proportional integral control.

In yet still a further aspect of the invention, the controller is a field oriented controller.

In yet another aspect of the invention, the machine is one of an induction machine, a synchronous machine or a permanent magnet motor.

In yet still a further aspect of the invention, a method is provided for use with a controller for controlling a machine wherein a torque reference value is provided. The method comprises the steps of obtaining feedback current and voltage values corresponding to the currents and voltages provided to the machine, calculating an estimated torque and an estimated flux based on the feedback current and voltage values, and calculating a torque error as a difference between the torque reference and the estimated torque. The torque error is then provided to a proportional integral control to provide a gain correction value, and the gain correction value is added to the estimated flux to provide a corrected flux estimate. The torque reference is divided by the corrected flux to generate a current command value for driving the machine.

In another aspect of the invention, the method further comprises the step of filtering the estimated flux in a low pass filter, and filtering the corrected flux estimate in a low pass filter.

In still a further aspect of the invention, the step of integrating the torque error comprises providing the torque error to a proportional integral control to calculate the gain correction value.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
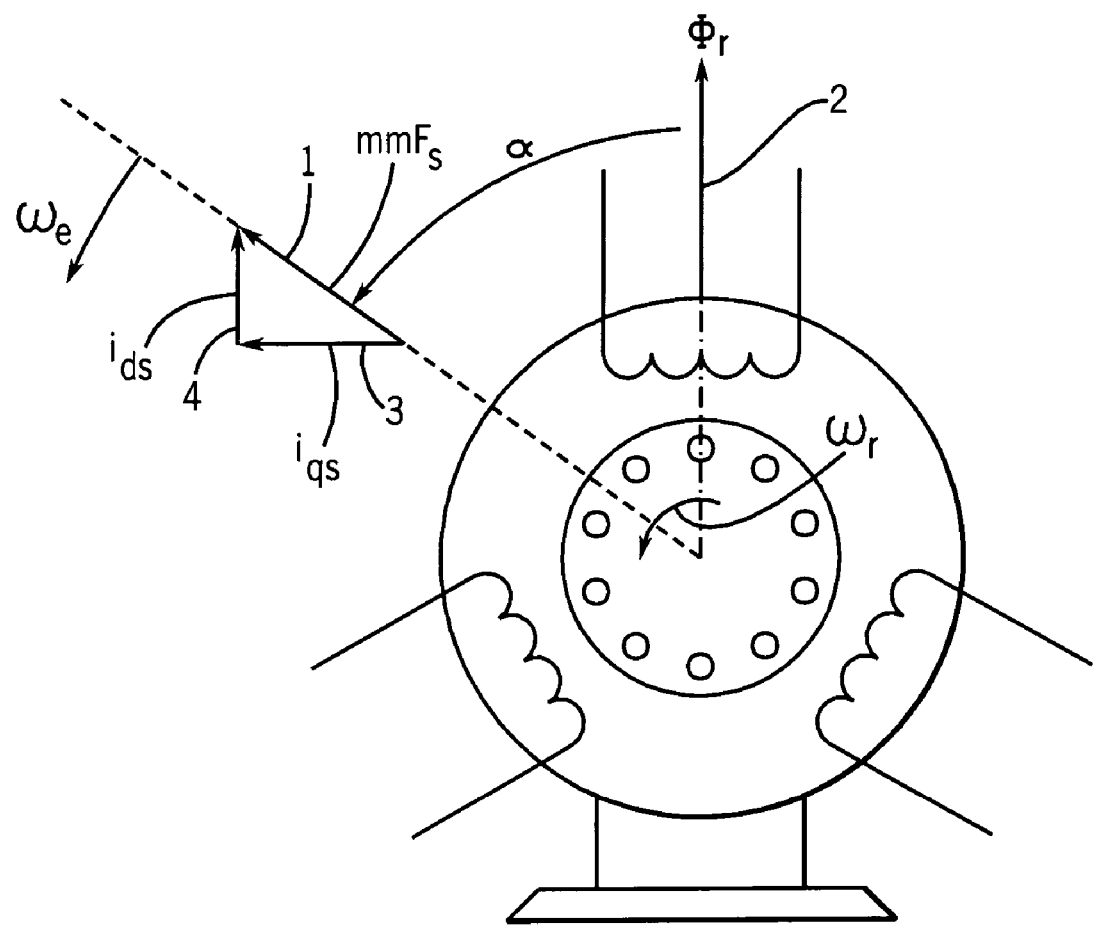
FIG. 1 is a schematic diagram illustrating the relationships between various currents and magnetic fields in an induction machine.

Hereinafter, unless indicated otherwise, an "*" will indicate a command signal, a "qs" subscript will indicate a signal associated with a stator q-axis in a d-q frame of reference, a "ds" subscript will indicate a signal corresponding to the d-axis in a d-q frame of reference, a "s" subscript will indicate a signal associated with a motor stator, a "ref" subscript will be used to indicate a reference signal that can, for example, incorporate some quantities determined and programmed during a commissioning procedure, an "est" subscript will be used to refer to an estimated value, a "fb" subscript will be used to refer to a feedback signal, "u" subscript and "v" subscripts will be used to refer to signals associated with two of the three phases of a motor and a "reg" subscript will be used to refer to a regulated value.

In addition, note that the term "derivative" is used herein to refer to two different mathematical concepts and that the context of the text in which the term appears should be used to determine which of the two meanings should be applied. First, derivative is used to refer to a change with respect to time as in Equations 2 and 3 below. Second, in some cases, the term derivative is used to refer to any derivation from an initial value. For instance, applying a proportional or proportional-integral gain to an initial value may result in a derivative of the initial value. Hereinafter the terms "value" and "signal" are generally used interchangeably.

While the present invention may be employed with adjustable frequency controllers to deliver current to any of several different types of loads including AC motors, generators, grid-tie inverters, etc., in the interest of simplifying this explanation, unless indicated otherwise, the invention will be described in the context of a system providing currents to an AC motor.

A. Theory

As a fundamental basis for the present invention, the electromagnetic torque of an AC motor can be expressed by the following equation:

$$T = \frac{3}{2} \cdot \left(\frac{P}{2}\right) \cdot (\lambda_{ds} \cdot i_{qs} - \lambda_{qs} \cdot i_{ds}) \quad \text{Eq. 1}$$

where,
P is the number of motor poles;
$i_{qs}$ is motor current aligned with the q-axis and typically reflects motor load;
$i_{ds}$ is motor current aligned with the d-axis and typically motor flux current;
$\lambda_{ds}$ is motor flux aligned with the d-axis; and
$\lambda_{qs}$ is motor flux aligned with the q-axis.

As well known in the art, the voltage equations in a dq frame of reference for an induction machine can be expressed as:

$$V_{qs} = r_s \cdot i_{qs} + \omega_e \cdot \lambda_{ds} + p\lambda_{qs} \quad \text{Eq. 2}$$

$$V_{ds} = r_s \cdot i_{ds} - \omega_e \cdot \lambda_{qs} + p\lambda_{ds} \quad \text{Eq. 3}$$

where,
$r_s$ is the stator resistance; and $p$ is derivative operator $\frac{d}{dt}$.

In steady state the last terms in each of Equations 2 and 3 drops out. Thus, in steady state, Equations 1 through 3 can be combined to express motor torque T using the following equation:

$$T = \frac{3}{2} \cdot \left(\frac{P}{2}\right) \cdot \left(\left(\frac{V_{qs} - r_s \cdot i_{qs}}{\omega_e}\right) \cdot i_{qs} + \left(\frac{V_{ds} - r_s \cdot i_{ds}}{\omega_e}\right) \cdot i_{ds}\right) \quad \text{Eq. 4}$$

Equation 4 can be rewritten using values that are generally easy to obtain in a control system. To this end, most control systems generate both d and q-axis command voltage values $V_{ds}^*$ and $V_{qs}^*$ and, generally, d and q-axis feedback voltage values $V_{dsfb}$ and $V_{qsfb}$, as well as d and q-axis feedback current values $i_{dsfb}$ and $i_{qsfb}$. Thus, Equation 4 can be rewritten as follows:

$$T_{est} = \frac{3}{2} \cdot \left(\frac{P}{2}\right) \cdot \left(\begin{array}{l}\left(\frac{V_{qsfb} - r_s \cdot i_{qsfb}}{\omega_e}\right) \cdot i_{qsfb} + \\ \left(\frac{V_{dsfb} - r_s \cdot i_{dsfb}}{\omega_e}\right) \cdot i_{dsfb}\end{array}\right) \quad \text{Eq. 5}$$

Referring to Equation 5, it should be appreciated that the values required to solve Equation 5 can be readily ascertained and used to identify an essentially real time torque estimate $T_{est}$. Where a torque reference or control value $T_{ref}$ is provided to a system indicating a desired torque, the applied torque estimate $T_{est}$ can be compared to the input torque value and the difference can be used to adjust the voltages applied to the load thereby causing the torque to converge toward the reference torque value $T_{ref}$. Although specific current and voltage feedback values are shown used in Equation 5, it will be apparent that similar results can be achieved and vice versa using q-axis and d-axis voltage and current command values in place of the feedback values.

B. Implementation

Referring now to the drawings wherein like symbols and numerals are used to refer to similar elements throughout the several views and, more specifically, referring to FIG. 2, the present invention will be described in the context of an exemplary motor control system 50 for driving a motor 92.

The motor control system 50, in general, receives a torque reference signal $T_{ref}$, determines system specific values including a value P (hereinafter the "pole count") indicating the number of poles associated with motor 92, a transient inductance value $L_\sigma$ and the stator resistance value $r_s$, and generates feedback for the current, voltage and rotational speed of the motor. The torque reference value, system specific values, and feedback values are used to produce a d-axis and a q-axis voltage command value, which are converted to AC voltages on three separate supply lines 95, 97, 99 linked to motor 92 to provide essentially real time control of torque applied to motor 92 so that the applied torque can be made essentially equal to the supplied reference torque value $T_{ref}$.

During a commissioning procedure prior to operation of the control system 50, system specific variables are determined and programmed for subsequent use by system 50. As described above, these values include a pole count P, a transient inductance value $L_\sigma$ and the stator resistance value $r_s$. Various algorithms exist for identifying system specific inductance value $L_\sigma$, and resistance value $r_s$, and any of those algorithms may be used here. One such method is described, for example, in U.S. Pat. No. 5,689,169, which is hereby incorporated by reference for its description of such a method.

Referring again to FIG. 2, the control system 50 includes circuitry for developing current, voltage, and rotational speed feedback for use in controlling the motor. Current feedback is generated by two current sensors 94 and 96 (e.g., Hall effect sensors) coupled to two of the three supply lines (e.g., 95 and 97) that are linked to motor 92 to sense currents passing through the supply lines, and to produce feedback current signals $i_{ufb}$ and $i_{wfb}$. The current feedback signals are provided to a two-three-two transformer 86 which identify the current passing through third line 99 based on the current feedback and transforms the two feedback currents into three feedback currents. Next, transformer 86 transforms the three phase currents into d and q-axis two-phase synchronous currents $i_{dsfb}$ and $i_{qsfb}$. The d and q-axis feedback currents $i_{dsfb}$ and $i_{qsfb}$ are provided to other system 50 components to determine how to alter the voltages applied to motor 92 via the three supply lines 95, 97 and 99 to drive motor 92 as described below. To provide voltage feedback the voltages on supply lines 95, 97, and 99 are also fed to a three-two transformer 87 to produce synchronous d-axis and q-axis feedback signals $V_{qsfb}$ and $V_{dsfb}$ signals.

Figure 2:
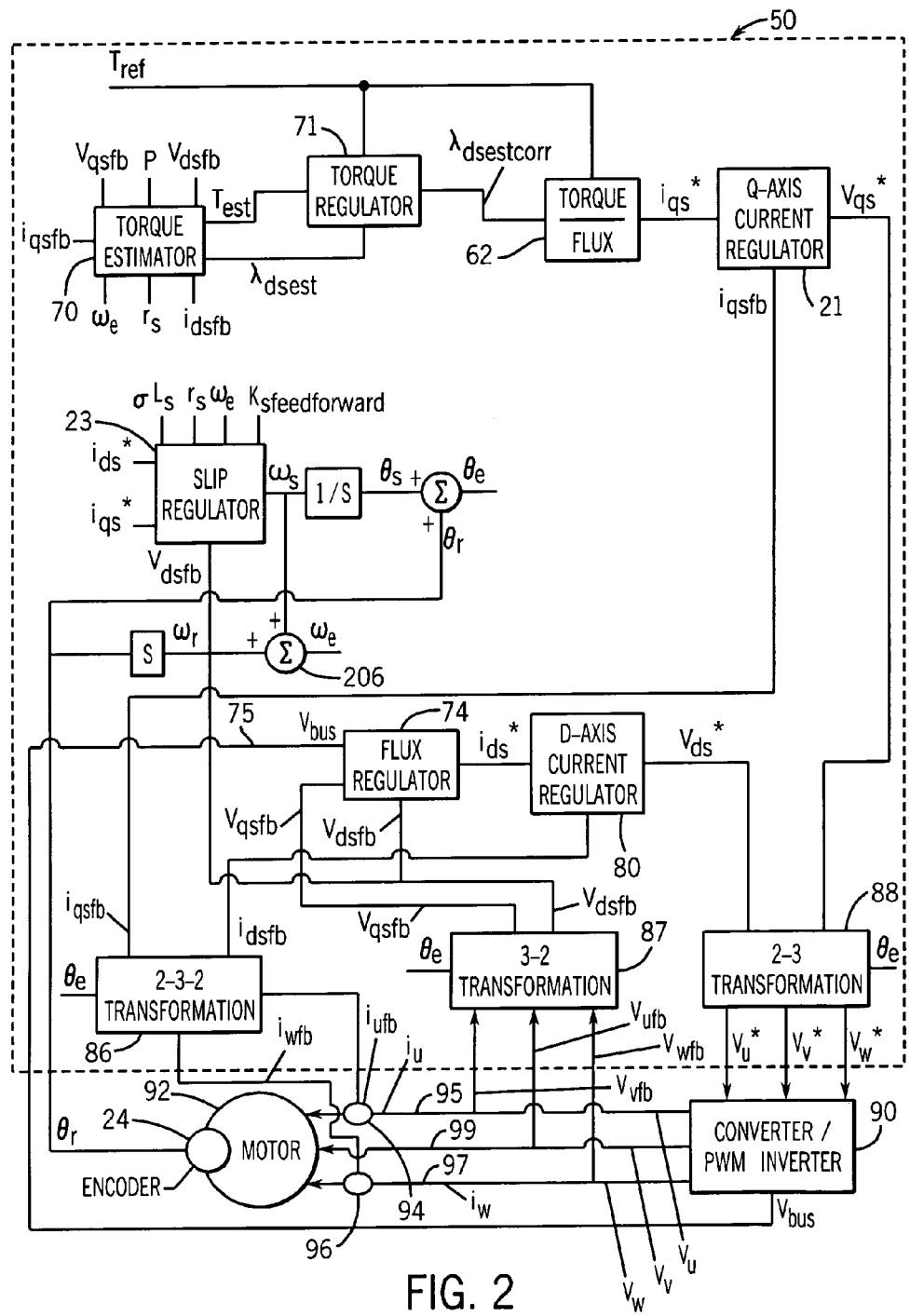
FIG. 2 is a schematic diagram illustrating an exemplary control system according to at least one embodiment of the present invention.

Referring still to FIG. 2, to provide rotor speed feedback, an encoder 24 is attached to motor 92 and generates a rotor position signal $\theta_r$ which is integrated to generate rotor speed $\omega_r$. The d-axis voltage feedback signal $V_{dsfb}$ and both the q-axis and d-axis current command signals are provided to slip frequency regulator 23 along with system specific values. The slip frequency regulator uses those signals to generate a slip frequency signal $\omega_s$, which is provided to a summer 206 along with rotor speed signal $\omega_r$. The summer 206 adds the rotor and slip frequency values to determine an operating frequency $\omega_e$.

Using the applied torque reference $T_{ref}$, system specific values, and feedback parameters described above, the control system 50 produces both a d-axis voltage command signal $V_{ds}^*$ and a q-axis voltage command signal $V_{qs}^*$. The d-axis and q-axis voltage command signals are converted to a three phase command voltage which is used to control motor 92, as described more fully below.

a. Q-axis Voltage Command

Referring still to FIG. 2 and, more specifically, according to the present invention, to produce the $V_{qs}^*$ voltage command, system 50 includes a torque and flux estimator 70, and a torque regulator 71. The torque regulator 71 receives both a torque estimate and a flux estimate from the estimator 71, and calculates an error correction for the flux which is used to calculate the q-axis voltage command, as described below.

Figure 3:
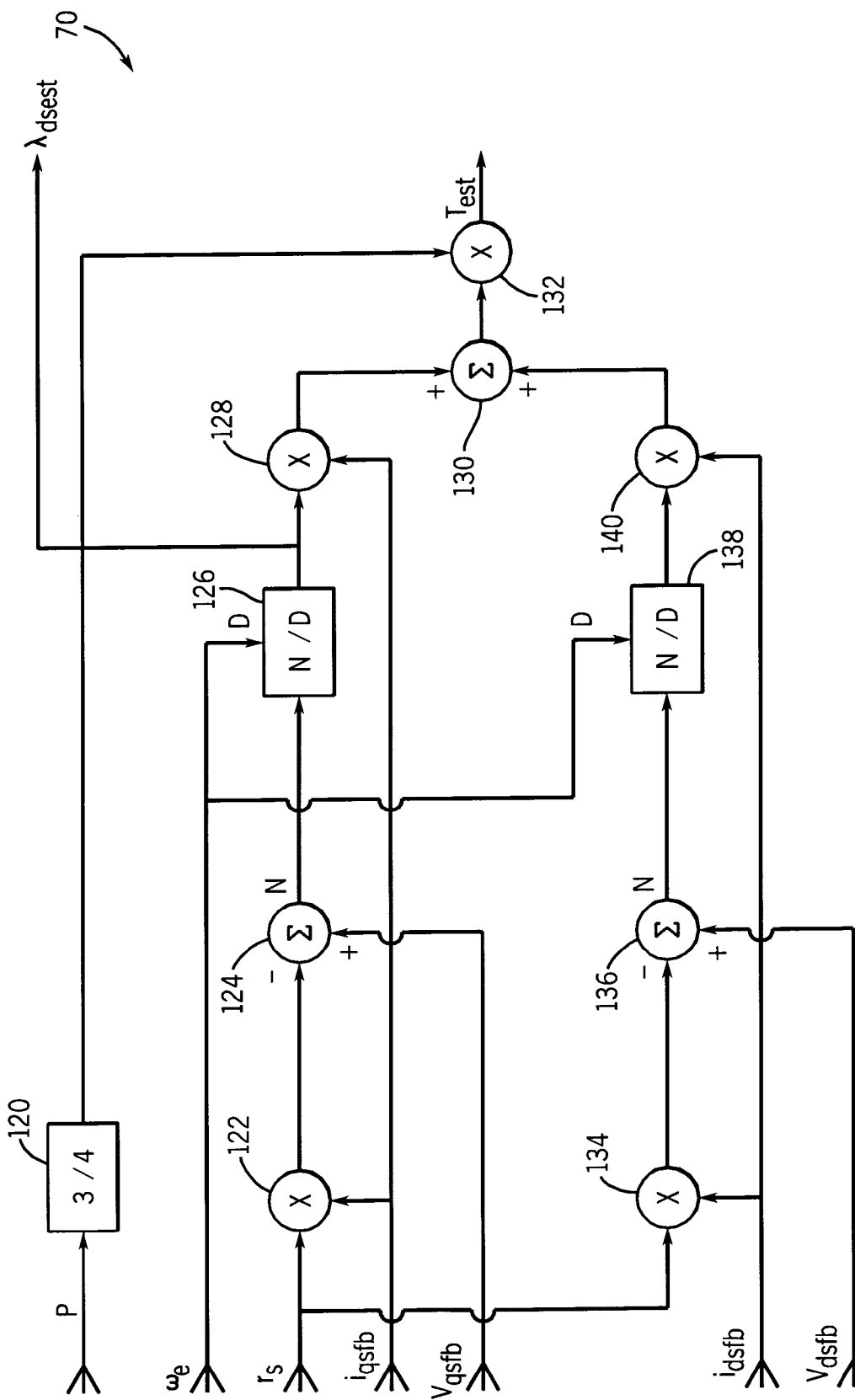
FIG. 3 is a schematic diagram illustrating components of the torque estimator of FIG. 2 according to at least one embodiment of the present invention.

Referring still to FIG. 2 and also to FIG. 3, the torque and flux estimator 70 receives the d and q-axis feedback signals $V_{dsfb}$ and $V_{qsfb}$, respectively, q-axis and d-axis current feedback, and system specific values to, among other things, generate a torque estimate value $T_{est}$ representative of the torque applied to motor 92 and a d-axis estimated flux $\lambda_{dsest}$. Torque estimate $T_{est}$ and d-axis flux estimate $\lambda_{dsest}$ are provided to torque regulator 71 which uses the torque estimate $T_{est}$ and the torque reference value $T_{ref}$ to generate a torque error signal. The torque error signal is used to adjust the estimated flux, which is then applied to the torque reference value to cause the torque applied to motor 92 to be substantially equal to the input torque value $T_{ref}$ as described below.

Referring still to FIG. 2 and also to FIG. 3, the torque and flux estimator 70 receives the d and q-axis feedback signals $V_{dsfb}$ and $V_{qsfb}$, d and q-axis feedback currents $i_{dsfb}$ and $i_{qsfb}$, and operational frequency value $\omega_e$, and accesses the system specific values to obtain a pole count value P and stator resistance value $r_s$. The estimator 70 then mathematically combines all of the received values to generate a torque estimate $T_{est}$ and a flux estimate $\lambda_{dsest}$ by evaluating Equations 5 above and equation 6, below, respectively:

$$V_{qsfb} = r_s i_{qsfb} + \omega_e \lambda_{dsest} \qquad \text{Eq. 6}$$

To this end, referring still to FIG. 3, estimator 70 includes a gain block 120, five multipliers 122, 128, 132, 134 and 140, three summers 124, 130 and 136 and two dividers 126 and 138. Value P corresponding to the number of poles associated with motor 92 is provided to block 120 which multiplies value P by ¾ and provides its output to multiplier 132. Stator resistance value $r_s$ is provided to each of multipliers 122 and 134. Multiplier 122 also receives the q-axis feedback current signal $i_{qsfb}$ and multiplies feedback signal $i_{qsfb}$ by resistance value $r_s$ providing its output to summer 124. Summer 124 subtracts the output of multiplier 122 from the q-axis feedback voltage value $V_{qsfb}$ and provides its output to divider 126. Divider 126 divides the output of summer 124 by frequency $\omega_e$ to provide the flux estimate $\lambda_{dsest}$, and provides this value to multiplier 128. Multiplier 128 multiplies the output of divider 126 by the q-axis feedback signal $i_{qsfb}$ and provides its output to summer 130.

Multiplier 134 multiplies the d-axis feedback current signal $i_{dsfb}$ by the stator resistance value $r_s$ and provides its output to summer 136. Summer 136 subtracts the output of multiplier 134 from the d-axis feedback voltage value $V_{dsfb}$ and provides its output to divider 138. Divider 138 divides the output of summer 136 by frequency $\omega_e$ and provides its output to multiplier 140. Multiplier 140 multiplies the output of divider 138 by the d-axis feedback current signal $i_{dsfb}$ and provides its output to summer 130. Summer 130 adds the outputs of multipliers 128 and 140 and provides its output to multiplier 132. Multiplier 132 multiplies the outputs of block 120 and summer 130 thereby generating the torque estimate value $T_{est}$ which is provided to torque regulator 71 in FIG. 2.

Figure 4:
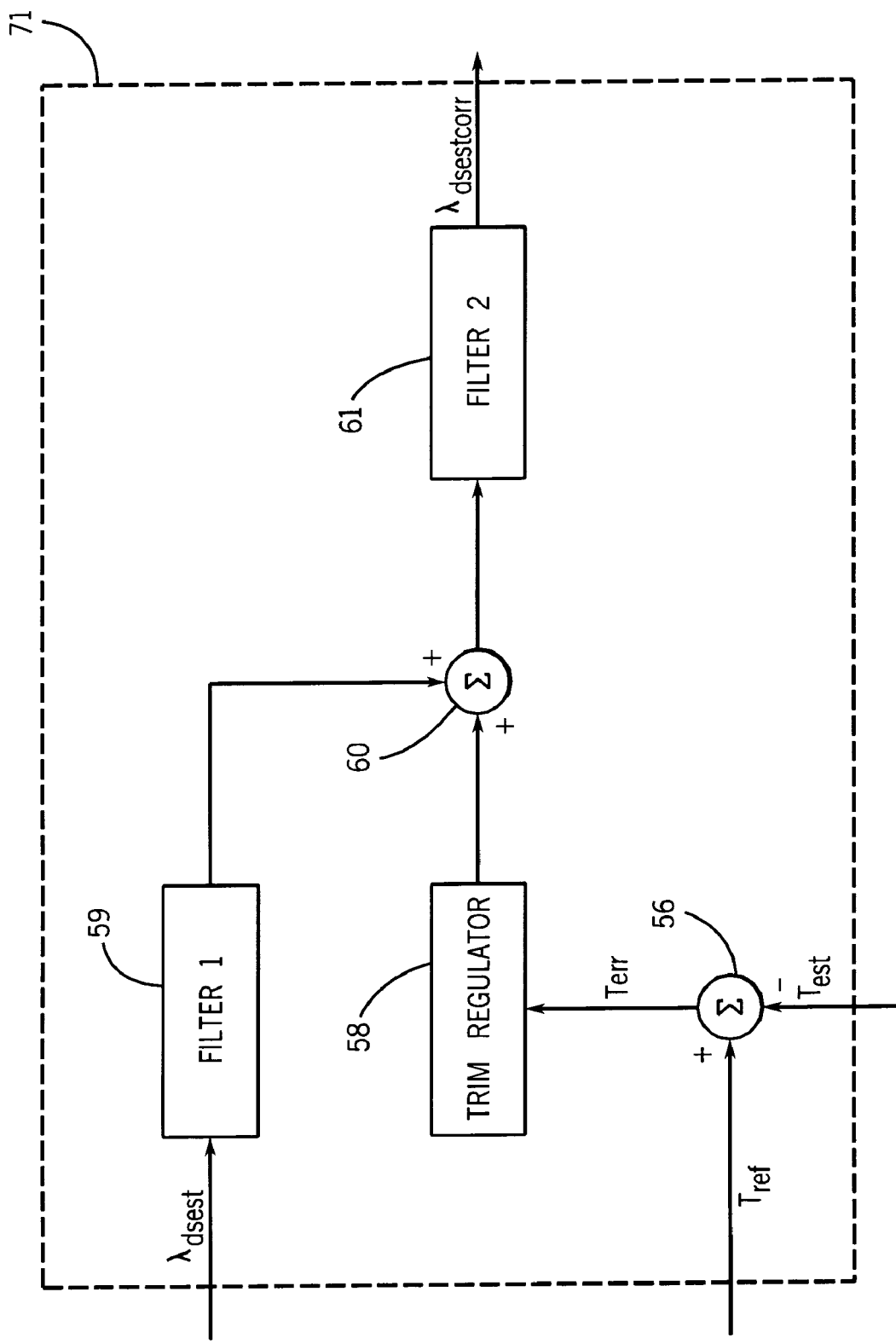
FIG. 4 is a schematic diagram illustrating the torque regulator of the present invention.

Referring again to FIG. 2 and also to FIG. 4, the outputs flux estimate $\lambda_{dsest}$ and $T_{est}$ from the torque and flux estimator 70 are provided to the torque regulator 71 along with the torque reference value $T_{ref}$. The torque regulator includes two summers 56 and 60, a trim regulator 58, and two filters 59 and 61. As illustrated, the reference torque value $T_{ref}$ and the torque estimate value $T_{est}$ are provided to the summer 56, which subtracts the estimated value Test from the reference torque value $T_{ref}$ to generate a torque error value $T_{err}$ which is provided to trim regulator 58. Regulator 58 is, in at least some embodiments, a PI regulator, producing a gain correction signal equivalent to a proportional integral gain of the error signal. The d-axis flux estimate $\lambda_{dsest}$ is filtered by filter 59 which, here is a low pass filter of 6 radians per second. The filtered d-axis flux estimate $\lambda_{dsest}$ is then fed to summer 60 along with the gain correction output of trim regulator 58. Summer 60 adds the gain correction value received from trim regulator 58 and the d-axis flux estimate $\lambda_{dsest}$ to generate a corrected flux estimate which is fed to and filtered by a second low pass filter 61 having a bandwidth of 12 radians per second.

The output of filter 61 is then fed to converter 62 along with the torque reference value $T_{ref}$ described above. The converter 62 scales the torque reference command value $T_{ref}$ by multiplying the torque command $T_{ref}$ by a conversion factor equivalent to 100% of the rated torque of the motor 92, and divides the scaled torque value by the corrected flux estimate received from the filter 61 to provide a q-axis current command value $i_{qs}*$.

The q-axis current command value is then fed to a q-axis current regulator 21. Current regulator 21 is a PI regulator which calculates the q-axis voltage based on the following equation:

$$V_{qs}* = (i_{ds}* - i_{dsfb})*(K_p + K_i/s) \quad \text{Eq. 7}$$

b. D-axis Voltage Command

Referring still to FIG. 2, to produce the $V_{ds}*$ command signal, voltage feedback from both the d-axis and q-axis $V_{dsfb}$ and $V_{qsfb}$ are fed to a flux regulator 74 along with the dc bus voltage 75 produced in the converter/pwm inverter 90 as described above. Flux regulator 74 includes a flux (PI) regulator, and, based on the value of the bus voltage 75 and the motor speed, calculates the d-axis current command $i_{ds}*$ in the following ways.

a) if the bus voltage 75 is at or above a predetermined level, and the motor speed is at or below a predetermined value, the motor is determined not to be in field weakening mode. Here, the d-axis (or "flux") current command $i_{ds}*$ is set to a constant pre-calculated value flux current reference determined from an automatic tuning procedure:

$$i_{ds}* = i_{\lambda ref}$$

Alternatively, the $i_{ds}*$ can also be determined from solving the following equation: $V_{qsref} = r_s*i_{qs} + \omega_e*Ls*i_{ds}$ and the PI regulator will control $i_{ds}*$ to maintain the calculated $V_{qsref}$ voltage on the motor.

b) if the bus voltage 75 (Vbus) is at or above a predetermined voltage and the motor speed is above the rated speed of the motor, the flux regulator 74 calculates a q-axis voltage reference value to field weaken the motor and to maintain the motor at the rated voltage, as follows:

$$V_{qsref} = sqrt(V_{rated}2 - V_{dsfb}2). \quad \text{Eq. 8}$$

The d-axis command current $i_{ds}$ is then regulated by the flux regulator 74 to maintain the calculated motor voltage using a PI regulator, as follows:

$$i_{ds}* = (V_{qs}* - V_{qsfb})*(K_p\lambda + K_i\lambda/s). \quad \text{Eq. 9}$$

c) if the bus voltage 75 is below the predetermined value, the flux regulator 74 performs a bus voltage margin calculation and the q-axis voltage command Vqs* is set equal to the bus margin calculation as follows:

$$V_{qsref} = V_{bus}* 2/pi*90\% (V_{default}). \quad \text{Eq. 10}$$

where $V_{default}$ is a stored value.

The calculated q-axis voltage reference Vqref is then provided to the PI regulator to control $i_{ds}*$.

$$i_{ds}* = (V_{qref} - V_{qsfb})*(K_p\lambda + K_i\lambda/s). \quad \text{Eq. 11}$$

The d-axis current command value $i_{ds}*$ calculated by the flux regulator 74 is then supplied to the d-axis current regulator 80 along with Ids feedback from transformer 86. The d-axis current regulator 80 is a PI regulator, which produces the d-axis voltage command value as follows:

$$V_{ds}* = (i_{ds}* - i_{dsfb})*(K_p + K_i/s) \quad \text{Eq. 12}$$

In addition to receiving frequency $\omega_e$, determiner 23 also obtains resistance value $r_s$ and inductance value $L_\sigma$ and receives q-axis and d-axis command currents $i_{qs}*$ and $i_{ds}*$, respectively, and solves the following equation to identify d-axis reference voltage $V_{dsref}$:

$$V_{dsref} = r_s*i*_{ds} - \omega_e L_\sigma i*_{qs} \quad \text{Eq. 13}$$

As described above, each of the d and q-axis command voltage signals $V_{ds}*$ and $V_{qs}*$ are provided to two-to-three phase transformer 88. Transformer 88 converts the d and q-axis command voltage signals $V_{ds}*$ and $V_{qs}*$ to three phase stationary command signals $V_u*$, $V_v*$ and $V_w*$ which are provided to converter/PWM inverter 90, which uses the three phase command voltage values to generate voltages on, and associated currents through, supply lines 95, 97 and 99 linked to motor 92 as well known in the art.

It should be understood that the methods and apparatuses described above are only exemplary and do not limit the scope of the invention, and that various modifications could be made by those skilled in the art that would fall under the scope of the invention. For example, while various components are described above as performing various functions and steps of overall processes, it should be appreciated that a single programmable processor will often be employed to perform many of the steps. In addition, while described above as used with an FOC controller, the inventive methods and systems are also useable with non-FOC drives operating in steady state. Moreover, while the invention is described above in the context of induction motor control, the invention may be used to control both synchronous and permanent magnet motors. In these cases the slip frequency $\omega_s$ would be zero.

To apprise the public of the scope of this invention, the following claims are made:

What is claimed is:

1. A method for use with a controller for controlling a machine wherein a torque reference value is provided, the method comprising the steps of:

obtaining feedback current and voltage values corresponding to the currents and voltages provided to the machine;

calculating an estimated torque and an estimated flux based on the feedback current and voltage feedback and $\omega e$ values;

mathematically combining the estimated torque and the torque reference to generate a gain correction;

mathematically combining the gain correction, the estimated flux value, and the torque reference to generate a current command for the machine.

2. The method of claim 1 wherein the machine is characterized by a pole count P and a stator resistance value rs and, wherein, the step of calculating an estimated torque comprises evaluating the following equation:

$$T_{est} = \frac{3}{2} \cdot \left(\frac{P}{2}\right) \cdot \left(\left(\frac{V_{qsfb} - r_s \cdot i_{qsfb}}{\omega_e}\right) \cdot i_{qsfb} + \left(\frac{V_{dsfb} - r_s \cdot i_{dsfb}}{\omega_e}\right) \cdot i_{dsfb}\right)$$

wherein $V_{qsfb}$ is the q-axis feedback voltage value, $V_{dsfb}$ is the d-axis feedback voltage value, $i_{qsfb}$ is the q-axis feedback current value, $i_{dsfb}$ is the d-axis feedback current value and $\omega_e$ is the operating frequency.

3. The method of claim 1, wherein the machine is operated at an operating frequency $\omega_e$ and wherein, the step of calculating an estimated flux comprises evaluating the following equation:

$$\lambda_{dsest} = \frac{V_{qsfb} - r_s i_{qsfb}}{\omega_e}$$

wherein $V_{qsfb}$ is the q-axis feedback voltage value, $\omega_e$ is the operating frequency, $r_s$ is the stator resistance value of the machine, and $i_{qsfb}$ is the q-axis current feedback value.

4. The method of claim 1, wherein the step of mathematically combining the estimated torque and the torque reference to generate a gain correction comprises the steps of calculating the difference between the estimated torque and the torque reference to provide a torque error and applying the torque error to a proportional integral control.

5. The method of claim 1, wherein the step of mathematically combining the gain correction, the estimated flux value, and the torque reference to generate a current command for the machine comprises summing the estimated flux with the gain correction and dividing the torque reference by the result of the summing operation.

6. The method of claim 1 wherein the controller is a field oriented controller.

7. The method of claim 1 wherein the machine is one of an induction machine, a synchronous machine and a permanent magnet motor.

8. The method of claim 1 wherein the step of obtaining feedback currents and voltages includes obtaining d and q-axis feedback currents and voltages and wherein the step of generating a current command value comprises generating a q-axis command current value to drive the machine.

9. An apparatus for use with a controller providing command voltage signals to control a machine wherein a torque reference value is provided, the apparatus for identifying an error indicative of the difference between the reference torque value and the torque applied to the machine and using the error value to modify control of the machine, the apparatus comprising:
  sensors for obtaining current values corresponding to the currents provided to the machine; and
  a processor running software to:
  mathematically combine the current values and feedback voltage values to generate a torque estimate and a flux estimate;
  mathematically combine the torque reference value and the torque estimate to generate a torque error value;
  mathematically combine the torque error value and the flux estimate to generate a corrected flux estimate;
  mathematically combine the corrected flux estimate and the torque reference to produce a current command; and
  use the current command value to control the machine.

10. The apparatus of claim 9 wherein the machine is characterized by a pole count P and a stator resistance value $r_s$ and, wherein, the controller is programmed to calculate an estimated torque by evaluating the following equation:

$$T_{est} = \frac{3}{2} \cdot \left(\frac{P}{2}\right) \cdot \left(\left(\frac{V_{qsfb} - r_s \cdot i_{qsfb}}{\omega_e}\right) \cdot i_{qsfb} + \left(\frac{V_{dsfb} - r_s \cdot i_{dsfb}}{\omega_e}\right) \cdot i_{dsfb}\right)$$

wherein $V_{qsfb}$ is the q-axis feedback voltage value, $V_{dsfb}$ is d-axis feedback voltage value, $i_{qsfb}$ is the q-axis feedback current value, $i_{dsfb}$ is the d-axis feedback current value and $\omega_e$ is the operating frequency.

11. The apparatus of claim 9, wherein the machine is operated at an operating frequency we and wherein, the controller is programmed to calculate an estimated flux by evaluating the following equation:

$$\lambda_{dsest} = \frac{V_{qsfb} - r_s i_{qsfb}}{\omega_e}$$

wherein $V_{qsfb}$ is the q-axis feedback voltage value, $\omega_e$ is the operating frequency, $r_s$ is the stator resistance value of the machine, and $i_{qsfb}$ is the q-axis current feedback value.

12. The apparatus of claim 9, wherein the controller is programmed to mathematically combine the estimated torque and the torque reference to generate an error value by calculating a difference between the estimated torque and the torque reference to provide a torque error and providing the torque error to a proportional integral control to calculate a gain correction.

13. The apparatus of claim 9, wherein the controller is programed to mathematically combine the gain correction, the estimated flux value, and the torque reference to generate a current command for the machine by summing the estimated flux with the gain correction and dividing the torque reference by the result of the summing operation.

14. The apparatus of claim 9 wherein the controller is a field oriented controller.

15. The apparatus of claim 9 wherein the machine is one of an induction machine, a synchronous machine and a permanent magnet motor.

16. A method for use with a controller for controlling a machine wherein a torque reference value is provided, the method comprising the steps of:
  obtaining feedback current and voltage values corresponding to the currents and voltages provided to the machine;
  calculating an estimated torque and an estimated flux based on the feedback current and voltage values;
  calculating a torque error as a difference between the torque reference and the estimated torque;
  providing the torque error to a proportional integral control to calculate a gain correction value;
  adding the gain correction value to the estimated flux to provide a corrected flux estimate; and dividing the torque reference by the corrected flux to generate a current command value for driving the machine.

17. The method as recited in claim 16, further comprising the step of filtering the estimated flux in a low pass filter.

18. The method as recited in claim 16, further comprising the step of filtering the corrected flux estimate in a low pass filter.

19. The method as recited in claim 16, wherein the controller is a field oriented controller.

20. The method as recited in claim 16, wherein the machine is one of an induction machine, a synchronous machine and a permanent magnet motor.

* * * * *